US006360020B1

(12) United States Patent
Panis

(10) Patent No.: US 6,360,020 B1
(45) Date of Patent: Mar. 19, 2002

(54) METHOD AND ARRANGEMENT FOR VECTOR QUANTIZATION AND FOR INVERSE VECTOR QUANTIZATION OF A DIGITIZED IMAGE

(75) Inventor: Stathis Panis, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,811

(22) PCT Filed: Aug. 21, 1997

(86) PCT No.: PCT/DE97/01806

§ 371 Date: Mar. 15, 1999

§ 102(e) Date: Mar. 15, 1999

(87) PCT Pub. No.: WO98/15125

PCT Pub. Date: Apr. 9, 1998

(30) Foreign Application Priority Data

Oct. 1, 1996 (DE) ......................................... 196 40 582

(51) Int. Cl.$^7$ ............................. G06K 9/36; G06K 9/38; G06K 9/46

(52) U.S. Cl. .................................. 382/253; 375/240.22

(58) Field of Search ................................ 382/232, 233, 382/251, 253; 375/240.03, 240.22

(56) References Cited

U.S. PATENT DOCUMENTS 5,596,659 A * 1/1997 Normile et al. ............. 382/253
5,649,030 A * 7/1997 Normile et al. ............. 382/253
5,696,851 A * 12/1997 Rao ........................... 382/253
6,205,256 B1 * 3/2001 Chaddha .................... 382/253

OTHER PUBLICATIONS

IEEE Transactions on Communications, vol. 41, No. 10, (1993), B. Zeng et al, "Interpolative BTC Image Coding with Vector Quantization", pp. 1436–1438.
Signal Processing Image Communication, vol. 6, No. 2, (1994), Huang, Ho–Chao et al, "Real–time software–based moving picture coding (SBMPC) system", pp. 173–187.
Proceedings of the International Conference on Acoustics, Speech, and signal Processing (ICASSP) (XP–002050992), Zeng, W., Directional Spatial Interpolation for DCT–Based Low Bit Rate Coding, pp. 2100–2103.
Proceedings of the IEEE, vol. 82, No. 6, (1994), C. Constantinescu et al, "Improved Techniques for Single–Pass Adaptive Vector Quantization", pp. 933–939.
European Transactions on Telecommunications and Related Technologies, vol. 6, No. 2, (1995), G. Poggi, Signal Processing Applications of the Kohonen algorithm in Vector Quantization, pp. 191–202.
Digital Image Processing, (XP 0020028501), (1978), Digital Spatial Processing Image Coding, pp. 662–666, 707.
T. Kim, New Finite State Vector Quantizers for Images, Proceedings of ICASSP, pp. 1180–1183, (1998).
IEEE Transactions on Image Processing, vol. 2, No. 1, (1993), R.F. Chang et al, "Image Coding Using Variable–rate Side–Match Finite–State Vector Quantization", pp. 104–108.
IEEE Transactions on Communications, vol. 36, No. 8, (1988), N.M. Nasrabadi et al, Image Coding Using Vector Quantization: A Review, pp. 957–971.

* cited by examiner

Primary Examiner—Bhavesh Mehta
(74) Attorney, Agent, or Firm—Schiff Hardin & Waite

(57) ABSTRACT

In a vector quantization of a digitized image, image regions (QB) to be quantized are selected smaller than, for example, image blocks (BB) of an image (B). In the reconstruction, image points (NBP) that are not located in an image region (QB) to be quantized are interpolated and/or extrapolated.

14 Claims, 3 Drawing Sheets

METHOD AND ARRANGEMENT FOR VECTOR QUANTIZATION AND FOR INVERSE VECTOR QUANTIZATION OF A DIGITIZED IMAGE

BACKGROUND OF THE INVENTION

The invention relates to the vector quantization and inverse vector quantization of a digitized image.

Vector quantization, and the inverse vector quantization connected therewith, is used for coding and compression of digitized images. It is based on the division of the image into two-dimensional image regions, and the determination of a code word that describes the respective image region to be quantized at best approximately, with respect to a predeterminable similarity criterion. Code words are vectors that have previously been stored as a set of standard vectors in what is called a code book. From the code book, vectors are imaged approximately onto vectors that describe the image information of the image region to be quantized. From this procedure, there also results the concept of vector quantization.

In the context of this document, an image region is to be understood as a set of image points of the digital image respectively to be quantized. The image regions can comprise an arbitrary shape and size.

In the following, a quantization vector is designated as a vector that is contained in a code book and that contains as vector components values of image information that are to be quantized. vector. In the following, the index is designated an entry of the code book. With the entry, the respective quantization vector is unambiguously identified. However, it is likewise possible to use the quantization vector itself as an entry of the code book.

Standardly, the entry of the code book is coded and is transmitted to a receiver.

For the reconstruction of the digitized image, after the decoding in a code book also present at the receiver, the received entry is imaged onto the quantization vector, and the quantization vector is used as an item of approximated image information for the reconstruction of the digitized image.

By means of this procedure, the required transmission rate for the transmission of the image information of the digitized image is reduced considerably, since only the index of the code book need respectively be transmitted, and not the entire image vector of the respective image block.

From the prior art document R. F. Chang and W. T. Chen, Image Coding using Variable-Side-Match Finite-State Vector Quantization, IEEE Transactions Image Processing, vol. 2, pp. 104–108, January 1993, it is known in addition to exploit correlations between image blocks, in order in this way to reduce further the required transmission rate. The method specified in the first cited prior art document T. Kim, New Finite State Vector Quantizers for Images, Proceedings of ICASSP, pp. 1180–1183, 1988 is designated as a finite state vector quantization (FSVQ). The respective state of the current input vector is defined by the respective image vector or, respectively, quantization vector immediately previously coded, i.e. quantized. The finite state vector quantization is a class of vector quantizations that use digital memories as described in R. F. Chang and W. T. Chen, Image Coding using Variable-Side-Match Finite-State Vector Quantization, IEEE Transactions Image Processing, vol. 2, pp. 104–108, January 1993.

In the following, an image vector is designated as a vector that respectively describes an image region, and which contains as vector components the image information to be quantized of the respective image region.

Under image information, for example luminance information, a brightness value allocated to the respective image point, chrominance information, a color value allocated to the respective image point, or also for example spectral coefficients, e.g. DCT transformation coefficients ( Discrete Cosine Transformation), are described.

It is known to group a digitized image to be coded into two-dimensional image regions with a rectangular shape T. Kim, New Finite State Vector Quantizers for Images, Proceedings of ICASSP, pp. 1180–1183, 1988. The image points of the image are thereby grouped into what are called image blocks.

Standardly, luminance values and/or chrominance values are allocated to the image points of the image block. The luminance values and/or the chrominance values of the respective image points respectively form, as a component of the image vector, the image vector to be quantized. In the known method, the image vector to be quantized is compared with the set of quantization vectors of the code book, which standardly have been stored previously and were for example stored in a read-only memory (ROM). The quantization vector of the code book is selected that is most similar to the image vector with respect to a predeterminable similarity measure. As a similarity measure, the sum of the quadratic difference of the individual components of the image vector and of the quantization vector is standardly used. If the "best" quantization vector has been determined, an index of the code book is standardly calculated for the identification of the quantization In the first cited prior art document T. Kim, New Finite State Vector Quantizers for Images, Proceedings of ICASSP, pp. 1180–1183, 1988, in addition two methods of finite state vector quantization (FSVQ) are described: what is called side-match vector quantization (SMVQ) and what is called overlap-match vector quantization (OMVQ).

Both methods have the aim of solving the problem of block artefacts that arise during the coding of image blocks.

In the SMVQ, it is presupposed that the distribution of the luminance information of the lines and columns of the image to be quantized can be described with a first-order Markov process, i.e. that the luminance values, allocated to the image points, of adjacent lines and columns are correlated with one another to a high degree. Under this presupposition, image points at the edge of the image blocks of an image block to be coded respectively contain a large part of the image information of previously coded adjacent image blocks. What is known as a state code book is formed, which contains code words that contain edge image points that comprise a high degree of similarity in comparison with edge image points already coded previously. The state code book is used for the selection of the most similar quantization vector of the code book for the respective image block. An advantage of the SMVQ or, respectively, of the FSVQ is that even for the case in which the image vector is not optimally described by the quantization vector, the error that arises is often not excessively visible to an observer of the reconstructed image, due to the correlation of adjacent image blocks.

In the OMVQ method, image blocks to be quantized are formed in that lines or, respectively, columns of adjacent image blocks partially overlap. For the determination of the quantization vector for the respective image block, the same procedure is used as in the FSVQ method or, respectively, in the SMVQ method. In the reconstruction of the image, the respective image block is again brought to its original size by respectively supplementing the overlapping lines or, respectively, columns between the image blocks with a line or, respectively, column of image points of which the average of the brightness values or, respectively, color values is assigned to the overlapping image points.

The known methods comprise some considerable disadvantages. For one, the methods are very complex, which leads to a considerable computing time requirement in the execution of the method by a computer.

In the context of this document, both an electrical data processing and also an arbitrary arrangement with a processor with which digital data can be processed are to be understood as computers.

In addition, the known methods presuppose a first-order Markov process, i.e. a high degree of correlation of adjacent image points of the digitized image. In the method, an additional indication of the state, i.e. an additional indication and taking into account of information of previously coded image blocks, is also required, which leads in turn to an increase in the required transmission rate.

Basic principles of vector quantization are described in the prior art document, N. Nasrabadi and R. King, Image Coding using Vector Quantization: A Review, IEEE Transactions on Communications, vol. 36, no. Aug. 8, 1988.

SUMMARY OF THE INVENTION

The invention is thus based on the problem of indicating a method for vector quantization and for inverse vector quantization of a digitized image in which the disadvantages of the known methods are avoided.

In general terms the present invention is a computer implemented method for vector quantization and for inverse vector quantization of a digitized image. At least a part of image points of the digitized image is grouped into at least one image region to be quantized and into at least one image region that is not to be quantized. Image information of the image region to be quantized is imaged onto an entry in a code book with which the respective image information of the image region to be quantized is approximately described. The respective entry of the code book is allocated to the image region to be quantized. The entry is imaged onto an approximated item of image information contained in the code book. The quantized image region is reconstructed from the approximated image information. The region of the image that was not quantized is reconstructed by means of interpolation and/or extrapolation of image information of the quantized image region.

Advantageous developments of the present invention are as follows.

The image region to be quantized is constructed with a rectangular shape.

The image region to be quantized is reconstructed using approximated image information of directly adjacent image regions.

Luminance values and/or chrominance values are used that are allocated to the image points of the image.

The size of the image region is adaptively constructed.

The size of the image region is selected dependent on the semantics of the image to be quantized.

The semantics of the image to be quantized is represented by a measure with which the change of image information within the image is represented.

The digitized image is divided into at least one image region to be quantized and into at least one image region that is not to be quantized. The image regions to be quantized are imaged in a code book by imaging the image information of the image regions onto at least one entry. This imaging is also designated vector quantization. The respective entry of the code book is allocated to the image region, and in the reconstruction of the digitized image the entry is imaged onto the approximated image information allocated to the entry in the code book. Using the approximated image information, the respective image region is reconstructed. Image points, i.e. image regions of the digitized image, that were not quantized are reconstructed by interpolation and/or extrapolation of image information of at least one quantized image region.

In this very simple way, it is possible to avoid having to quantize the entire digitized image; rather, only a sub-region of the digitized image need be quantized.

In relation to the known methods, it is not necessary that it be possible to describe the curve of the image information by means of a first-order Markov process.

In relation to the known methods, the method is considerably simplified in its execution. This has the result that a considerable reduction of the required computing capacity for quantization and for inverse quantization, and thus for the overall coding or, respectively, decoding of the digitized image, is achieved.

A further reduction of a bandwidth requirement required in the transmission of the image is achieved in that the size of the image regions to be quantized is constructed adaptively, i.e., that for example, dependent on the semantics of the digitized image, image regions of different size are selected as image regions to be quantized. In this way, for example given very uniform image regions with high redundancy within the image information, a small size of the image region to be quantized will already suffice to ensure a good quality of the constructed image. On the other hand, for example in regions of the image that comprise very detailed structures, a quantization of larger image regions is necessary to enable these regions actually to be simulated well. If image regions of small size are quantized, interpolation takes place over a larger number of image points of non-quantized image regions, and, conversely, given larger image regions to be quantized, interpolation or, respectively, extrapolation takes place only over a small number of non-quantized image points.

In this way, an optimized matching of the required transmission rate to the semantics of the image is possible.

In addition, it is advantageous to take into account prior knowledge concerning the image, for example prior knowledge concerning very uniform image regions with respect to the image information and concerning image regions with very detailed construction in the selection of the size of the image region that is respectively to be quantized. This development also achieves an improvement of the required transmission rate.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
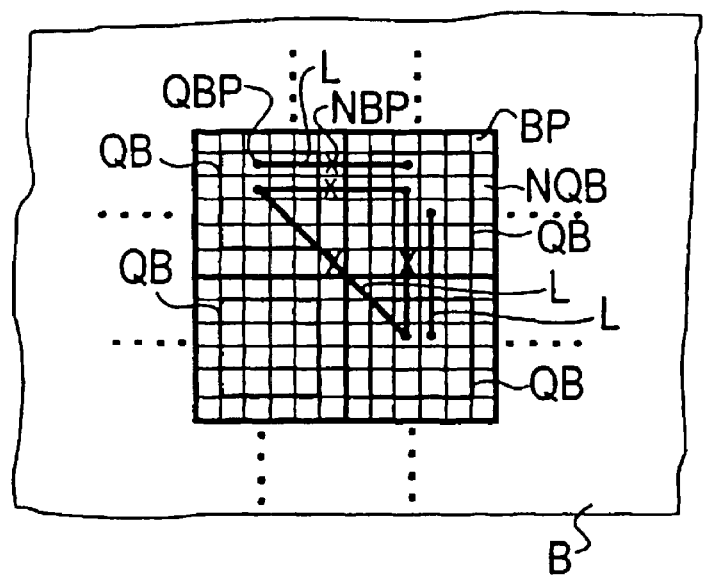
FIG. 1 shows a drawing of a digitized image with image points and image regions to be quantized.

FIG. 1 shows a digitized image B. The digitized image B comprises an arbitrary number of image points BP to which luminance values (brightness values) and/or chrominance values (color values) are standardly unambiguously allocated.

However, it is also possible to allocate e.g. spectral coefficients, for example what are called DCT coefficients (Discrete Cosine Transformation), to the image points during the processing of the digitized image B in the spectral region.

The values allocated to the image points are designated image information. With the image information, the semantics of the image B is generally described.

By means of the dotted lines, it is indicated in FIG. 1 that the number of image points BP within the image B is arbitrary.

In addition, FIG. 1 shows image regions QB that are to be quantized. An image point QBP to be quantized that is located inside an image region B to be quantized is taken into account in the imaging (described below) onto at least one quantization vector stored in what is known as a code book. An image point NBP that is not to be quantized, not located in an image region QB to be quantized, is not taken into account in the imaging onto the quantization vector.

For the simpler representation of the method, the image regions QB to be quantized comprise a square shape in FIG. 1.

However, this is in no way necessary. The shape of the image regions QB to be quantized is, in general, arbitrary. Likewise, the size of the image regions QB to be quantized can be arbitrarily predetermined.

It is required only that the allocation of the image information to the image points that respectively form the image vector is unambiguous in such a way that the allocation of the individual components within the code book, thus within the quantization vectors in the sequence, is equal.

Figure 2:
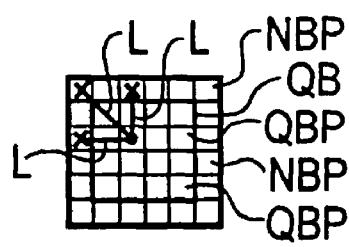
FIG. 2 shows a quantized image region and image points at the edge of an image that are reconstructed by extrapolation of image information of the inversely quantized image region.

FIG. 2 shows an image region QB to be quantized, and image points BP that are not located in the image region QB to be quantized. Solid connection lines L symbolically indicate that the value of the image information for the respective image point NBP, which is not located in the image region QB to be quantized, results from extrapolation of image information along the respective solid line L, or also from extrapolation of image information of adjacent image points of the respective line L. The extrapolation is particularly suitable for an image region QB to be quantized on the edge of an image, since in an edge region of an image there is no further image region QB to be quantized that contains information that could be taken into account by means of an interpolation between the corresponding image points of the image regions QB to be quantized. In this case, it is useful to carry out an extrapolation of the respective image information for an image region QB to be quantized that is located on the edge of the image.

Figure 3:
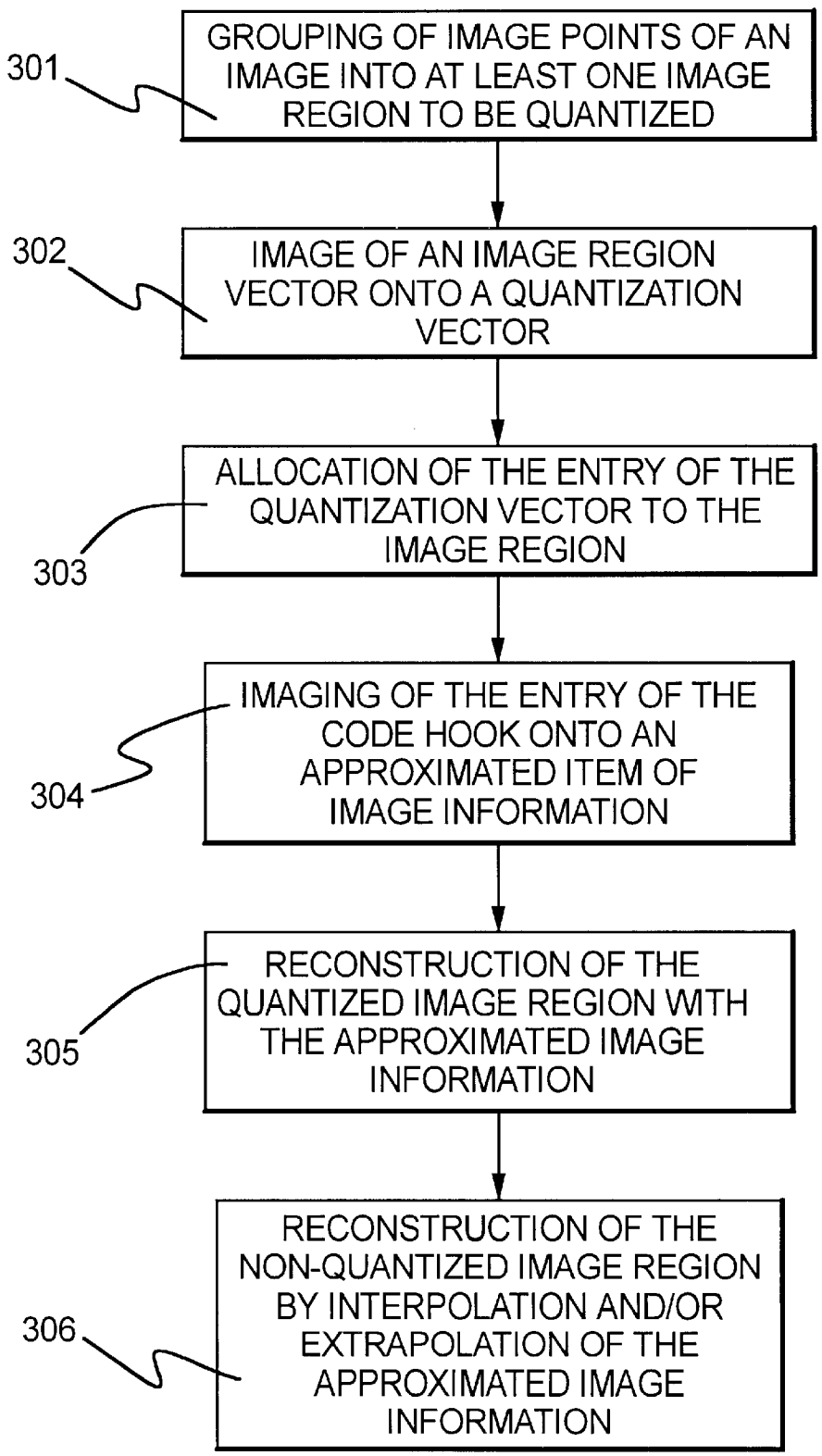
FIG. 3 shows a flow diagram in which the individual method steps of the inventive method are shown.

FIG. 3 shows, in the form of a flow diagram, the method in its individual method steps.

In a first step 301, the image points BP of the image B are grouped into at least one image region QB to be quantized, whereby other image points BP of the image BP are not grouped into the image regions QB to be quantized.

The respective image information of an image point QBP located in the image region QB to be quantized forms a component of an image region vector. The sequence of the individual image points or, respectively, of the image information allocated to the image points QBP within the image region vector is, in general, arbitrary, but however must be consistent in sequence with the vector components of quantization vectors that are contained in the code book.

The image region vector is imaged onto at least one quantization vector in the code book. This takes place for example by respective comparison of the image region vector with at least one part of the quantization vectors, in that for example a sum over the quadratic difference of the individual components of the image region vector and of the quantization vector is formed. The quantization vector is selected that is most similar to the image region vector with respect to the (generally freely predeterminable) similarity measure.

Standardly, an index that unambiguously identifies the respective quantization vector is allocated to the quantization vector in the code book. In the following, the index is designated as an entry of the code book. The entry of the code book can however also be the quantization vector itself.

As was described above, in a second step 302 the image information is imaged onto the entry in the code book in the form of the image region vector.

In a further step 303, the respective entry of the code book is unambiguously allocated to the image region QB respectively to be quantized, whose image region vector was imaged onto the quantization vector.

Given an inverse vector quantization of the image B, the entry of the code book is imaged 304 onto an approximated item of image information, the quantization vector. By the approximated image information is meant the quantization vector identified by the entry of the code book, which vector is used in the reconstruction of the image B for the image region.

Using the quantization vector, the image region QB to be quantized is reconstructed 305. This takes place by allocation of the respective image information within the quantization vector to the respectively unambiguously designated image point QBP within the image region QB to be quantized.

In the inverse quantization, in a last step 306 image points NBP not located in an image region QB to be quantized are reconstructed in that image points located between two image regions QB to be quantized are interpolated by interpolation of image information of the image points that are adjacent to the image points NBP of the image regions NQB that are not to be quantized.

Image points NBP that are located in an image region QB that is not to be quantized and are also not located between several image regions QB to be quantized, e.g. are located at the edge of the image B, are advantageously determined by extrapolation of the image information of the bordering image region QB to be quantized and the image information of the image points QBP contained in the image region QB to be quantized.

For the interpolation of the image information, e.g. of the luminance values or chrominance values of the individual image points BP, and thus for the determination of the image information for the image points NBP that are not located in a region QB to be quantized, in principle any arbitrary interpolation function, i.e. any arbitrary function, can be used. The following one-dimensional function has proven advantageous and sufficient:

$$f(x_0) = \frac{14x_{-1} + 10x_{-2} + 4x_{-3} + 12x_1 + 6x_2 + (-2)x_3}{s}. \quad (1)$$

$f(X_0)$ designates the image information to be determined of the respective image point NBP. $x_1$, $x_2$, $x_3$, $x_1$, $x_2$, $x_3$ designate the image information of the image points that are located along a predeterminable direction adjacent to the image point NBP, for which the respective value of the image information is to be determined. In a variant of the invention, it is provided that, using the function, not just one value of the image information of an image point NBP is determined, but rather by interpolation an arbitrary number of image points NBP, not located in an image region QB to be quantized along the predeterminable direction, are simultaneously determined.

The same rules of nomenclature hold for an advantageously usable extrapolation function that for example comprises the following structure:

$$f(x_0) = \frac{14x_{-1} + 10x_{-2}}{s}. \quad (2)$$

The sum of the values of the image information of the image points BP taken into account, e.g. the sum of all brightness values of the image points BP taken into account in the interpolation or, respectively, in the extrapolation, is designated s.

In a development of the method, it is provided that within an image B the size of the image regions QB is selected adaptively, e.g. dependent on the semantics of the image B.

By semantics is meant, in this context, e.g. the structure of the image B, e.g. whether a very large number of changes of the image information, e.g. of the luminance values, are present in a region of the image B, thus whether the image B comprises considerable detail structures in the region, or whether the image region comprises a very uniform structure, e.g. a larger surface with almost uniform luminance values, or also with almost uniform chrominance values.

For simpler representability, in the following only image blocks of size 2×2 image points or, respectively, 4×4 image points are explained as image regions to be quantized.

In general, the principle explained below can however be applied to an arbitrary number of image points, i.e. to an arbitrary size of the image regions QB to be quantized.

As a measure t for the semantics of the image B, the variance of the luminance values can be used, e.g. for the case in which the image information is given by the luminance values. The variance results for example from the quotient of the difference of the maximum luminance values max and the minimum luminance values min, as well as the sum of the maximal luminance values max and the minimal luminance values min of the image points taken into account in the interpolation or, respectively, extrapolation:

$$t = \frac{\max - \min}{\max + \min}. \quad (3)$$

If the measure t is smaller than a predeterminable limit, it is for example sufficient that only a 2×2 image block Z is quantized, and the rest e.g. of an image block to be coded of 8×8 image points BP can be interpolated during the reconstruction. If, however, the value is greater than the limit, it is for example necessary to quantize a 4×4 image block V in order to enable better simulation of a detail structure contained in the image block.

Figure 4:
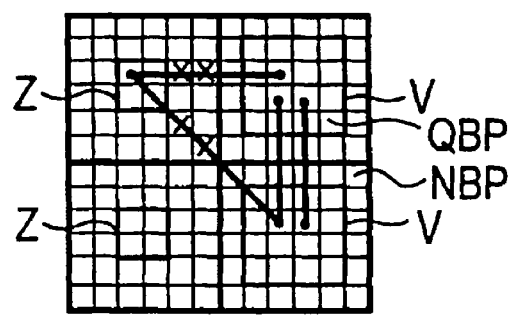
FIG. 4 shows a drawing in which a development of the method is shown with image regions of different size that are to be quantized.

This situation of interpolation between the image blocks QB to be quantized with image blocks QB of different size to be quantized is shown in FIG. 4. For this case, of course, a number of code books corresponding to the different sizes and shapes of image regions used that are to be quantized is required in order to carry out the corresponding vector quantization and inverse vector quantization.

In addition, in a development of the method it is provided that in the method prior knowledge concerning the semantics of the image is taken into account at the beginning of the method. If for example it is known before the quantization of the image that a larger region of the image B comprises a uniform structure, and only a smaller part of the image comprises a very highly detailed structure, then it is advantageous during the quantization to determine the part with the increased detail structure more precisely, i.e. to quantize with an image region QB to be quantized, and e.g. to determine, during the inverse quantization, the remaining part of the image only by extrapolation of edge points of the image region QB to be quantized.

Independent of the method described above for vector quantization, the following method for vector quantization can be used.

In this method, no interpolation or, respectively, extrapolation of the image information is carried out; rather, for an image region QB to be quantized that is smaller than for example the entire image B, image points NBP that are not located in an image region QB to be quantized are reconstructed in that for example an average value of an arbitrary number, for example of directly adjacent image points of the image region QB to be quantized, is determined, and this average value is allocated to the respective image point NBP.

By this procedure a considerable reduction of the scope of the code book required is also achieved, since in turn the image region QB to be quantized is considerably smaller than in known methods in which all the image points of the image B are quantized in image blocks.

The following observation can clarify the advantages of the invention.

For an image block of size 6×6 image blocks, e.g. the size of the code book is $256^{36}$ entries in size. For an image block of size 4×4 image points, the number of entries in the code book is reduced to $256^{16}$. For this reason, due to the fact that by means of the inventive method and the interpolation connected therewith the size of the image regions QB to be quantized is reduced considerably, the coding can be carried out considerably faster, or, alternatively, with considerably more precision.

In addition, by means of this procedure the interpolation achieves a considerable reduction of block artefacts occurring in the block-based image coding.

In addition, a considerable reduction of the required transmission rate of the entries of the code book is achieved.

Figure 5:
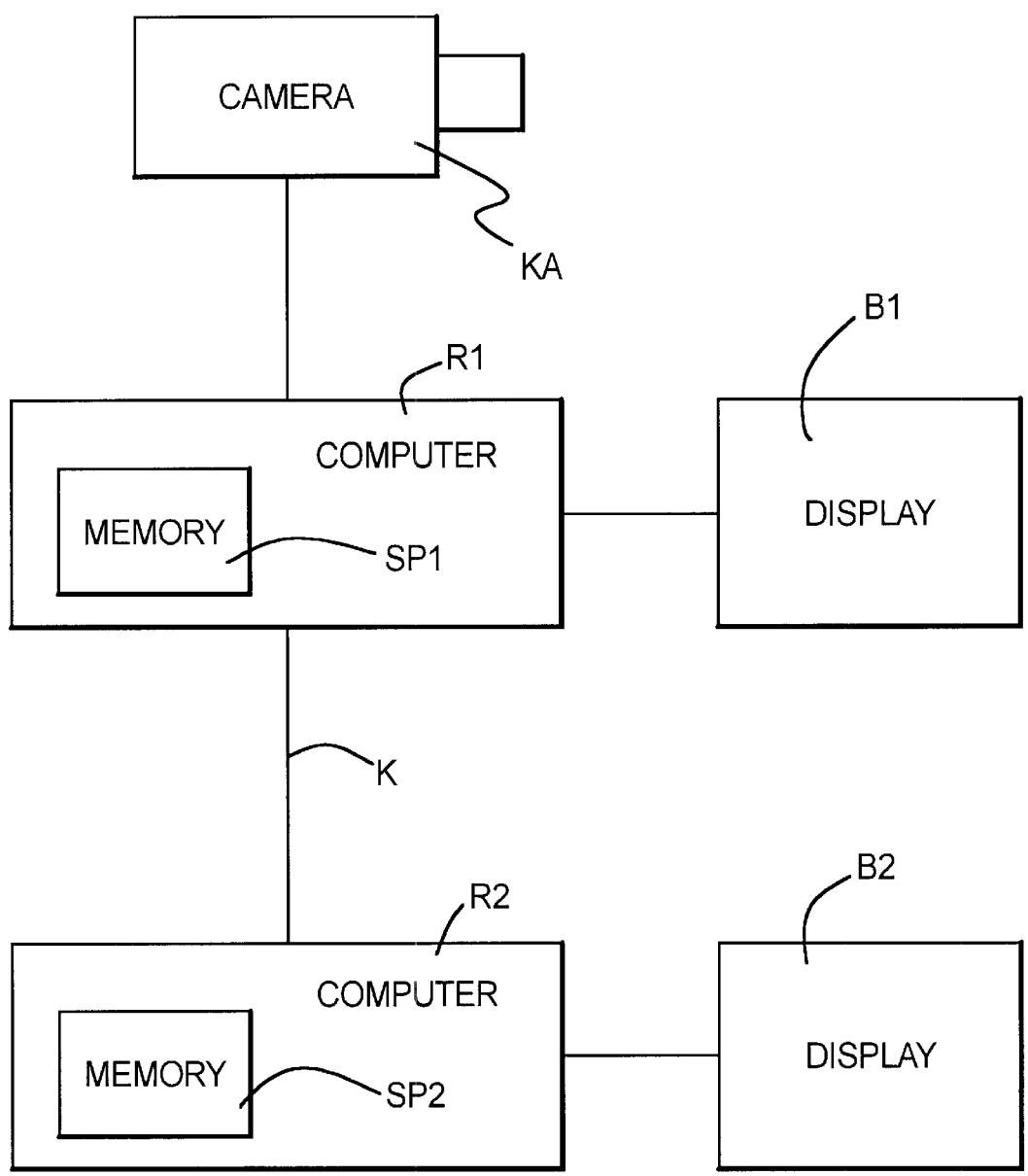
FIG. 5 shows a computer arrangement with which the method is standardly executed.

In FIG. 5, among other things a first computer R1 is shown with which the inventive method is carried out.

In addition, FIG. 5 shows a camera KA with which a sequence of images is recorded that is converted in the first computer R1 into a sequence of digital images B. The digital images B are stored in a memory SP1 of the first computer R1. In addition, in this arrangement a display screen B1 is provided for the first computer R1.

During a transmission of the digitized image B, before the transmission of the digitized image B the method is applied to the individual image segments BS1, BS2. The spectral coefficients resulting therefrom are transmitted via a channel K to a second computer R2, where they are stored in a second memory SP2. After execution of the inverse image transformation coding and of the inverse conformal imaging, the digitized image B is again reconstructed in the second computer R2, and is displayed to a user on the second display screen B2.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for vector quantization and for inverse vector quantization of a digitized image, comprising the steps of:
   grouping at least a part of image points of the digitized image into at least one image region to be quantized and into at least one image region that is not to be quantized;
   imaging image information of the image region to be quantized onto an entry in a code book with which the image information of the image region to be quantized is approximately described;
   allocating the entry of the code book to the image region to be quantized;
   imaging the entry onto an approximated item of image information contained in the code book;
   reconstructing the quantized image region from the approximated image information; and
   reconstructing the region of the image that was not quantized by at least one of interpolation and extrapolation of image information of the quantized image region.

2. The method according to claim 1, wherein the image region to be quantized is constructed with a rectangular shape.

3. The method according to claim 1, wherein the image region to be quantized is reconstructed using approximated image information of directly adjacent image regions.

4. The method according to claim 1, wherein at least one of luminance values and chrominance values are used that are allocated to image points of the image.

5. The method according to claim 1, wherein a size of the image region is adaptively constructed.

6. The method according to claim 5, wherein size of the image region is selected as a function of semantics of the image to be quantized.

7. The method according to claim 6, wherein the semantics of the image to be quantized are represented by a measure with which a change of image information within the image is represented.

8. An arrangement for vector quantization and for inverse vector quantization of a digitized image, comprising:
   at least one processor unit that is set up such that
   at least a part of image points of the digitized image is grouped into at least one image region to be quantized and into at least one image region that is not to be quantized,
   image information of the image region to be quantized is imaged onto an entry in a code book, with which the respective image information of the image region to be quantized is approximately described,
   the respective entry of the code book is allocated to the image region to be quantized,
   the entry is imaged onto an approximated item of image information that is contained in the code book,
   the quantized image region is reconstructed from the approximated image information, and
   the region of the image that was not quantized is reconstructed by at least one of interpolation and extrapolation of image information of the quantized image region.

9. The arrangement according to claim 8, wherein the processor unit is set up such that the image region to be quantized is constructed with a rectangular shape.

10. The arrangement according to claim 8, wherein the processor unit is set up such that the image region to be quantized is reconstructed using approximated image information of directly adjacent image regions.

11. The arrangement according to claim 8, wherein the processor unit is set up such that at least one of luminance values and chrominance values allocated to image points of the image are used as image information.

12. The arrangement according to claim 8, wherein the processor unit is set up such that a size of the image region is adaptively constructed.

13. The arrangement according to claim 12, wherein the processor unit is set up such that the size of the image region is selected dependent on semantics of the image to be quantized.

14. The arrangement according to claim 13, wherein the processor unit is set up such that the semantics of the image to be quantized is represented by a measure with which a change of image information within the image is described.

* * * * *